United States Patent
Esposito et al.

(10) Patent No.: US 12,183,033 B2
(45) Date of Patent: Dec. 31, 2024

(54) LASER STRIKE ORIGIN DETERMINATION FOR AN AIRCRAFT

(71) Applicant: The Boeing Company, Chicago, IL (US)

(72) Inventors: Christopher Esposito, La Grande, OR (US); James J. Troy, Issaquah, WA (US)

(73) Assignee: THE BOEING COMPANY, Arlington, VA (US)

( * ) Notice: Subject to any disclaimer, the term of this patent is extended or adjusted under 35 U.S.C. 154(b) by 96 days.

(21) Appl. No.: 17/991,089

(22) Filed: Nov. 21, 2022

(65) Prior Publication Data

US 2024/0169583 A1    May 23, 2024

(51) Int. Cl.
  *G01S 5/16*    (2006.01)
  *G06T 7/73*    (2017.01)
  *G06T 17/05*   (2011.01)
  *H04N 25/00*   (2023.01)

(52) U.S. Cl.
  CPC .............. *G06T 7/74* (2017.01); *G01S 5/16* (2013.01); *G06T 7/75* (2017.01); *G06T 17/05* (2013.01); *G01S 2205/03* (2020.05); *G06T 2207/10032* (2013.01); *H04N 25/00* (2023.01)

(58) Field of Classification Search
  CPC .. G06T 7/74; G06T 7/75; G06T 17/05; G06T 2207/10032; G01S 5/16; G01S 2205/03; H04N 25/00
  See application file for complete search history.

(56) References Cited

U.S. PATENT DOCUMENTS

| | | | |
|---|---|---|---|
| 8,744,133 B1 | 6/2014 | Troy et al. | |
| 9,134,174 B2 | 9/2015 | Jungwirth | |
| 2017/0124885 A1* | 5/2017 | Patterson | G08G 5/0069 |
| 2018/0067484 A1* | 3/2018 | Troy | G01S 17/88 |
| 2018/0250484 A1* | 9/2018 | McCormick | A61B 1/05 |
| 2019/0011529 A1* | 1/2019 | Choi | G06V 20/653 |

OTHER PUBLICATIONS

Marino "High-resolution 3D imaging laser flight test experiments" (Year: 2005).*
Murphy, P., "US: $208 million contract to protect Army helicopters from laser threats", LaserPointerSafety, Retrieved from the internet: URL: https://www.laserpointersafety.com/news/news/other-news_files/2d82bcdaf27c847bf2a13d56c32ba5a5-344.php#on [retrieved on Sep. 12, 2022]; Sep. 3, 2013; pp. 1-2.
Murphy, P., "US: Student develops experimental laser location detection device", LaserPointerSafety, Retrieved from the internet: https://www.laserpointersafety.com/news/news/other-news_files/tag-laser-event-recorder.php#on [retrieved on Sep. 12, 2022]; Feb. 13, 2017; pp. 1-7.

* cited by examiner

*Primary Examiner* — Eileen M Adams
(74) *Attorney, Agent, or Firm* — COATS & BENNETT, PLLC

(57) ABSTRACT

Methods and devices that determine a position on the ground of a laser that emits a laser beam that strikes an aircraft. The process includes determining a strike position from a camera that is located on the aircraft. A relative direction vector of the laser beam is computed with respect to the camera. The relative direction vector is converted into a global coordinate direction vector. The position on the ground of the laser is determined based on a point where the global coordinate direction vector intersects with the ground representation.

29 Claims, 12 Drawing Sheets

LASER STRIKE ORIGIN DETERMINATION FOR AN AIRCRAFT

TECHNOLOGICAL FIELD

The present disclosure relates generally to the field of aviation and, more specifically, to methods and systems for determining a location on the ground of a laser that emits a laser beam aimed at an aircraft.

BACKGROUND

Laser strikes on commercial aircraft have occurred several thousand times a year for the last several years. The consequences of these laser strikes can include one or more of pilot distraction, the need for quick and unplanned evasive maneuvers, flash blindness, and eye damage that can last for weeks. The laser strikes frequently occur during takeoff or landing which are critical times during airflight that require the pilots to concentrate on the various flight aspects. Laser strikes overall and particularly during critical time can potentially jeopardize flight safety. Further, the pilots are more vulnerable during the critical times as they are required to perform the various flight aspects and are unable to otherwise defend themselves or take defensive measures.

Detecting laser strikes and warning the pilots in real time as the laser strikes occur has proven to be a difficult problem to solve. Despite the large number of occurrences, only a small fraction of the persons responsible for the laser strikes are found and convicted. This is due to difficulties in locating the source of the laser beam on the ground and finding the responsible persons.

SUMMARY

One aspect is directed to a method of determining a position of a laser on the ground that emits a laser beam that strikes an aircraft. The method comprises: determining a strike position of the laser beam on an imaging sensor of a camera with the camera positioned in or on the aircraft and the laser beam being emitted from a laser on the ground and aimed at the aircraft; computing a relative direction vector of the laser beam with respect to the camera; converting the relative direction vector into a global coordinate direction vector; and determining a position on the ground of the laser that emitted the laser beam with the position comprising where the global coordinate direction vector intersects with a ground representation.

In another aspect, computing the relative direction vector of the laser beam with respect to the camera comprises: determining a global position of the camera and a global orientation of the camera; computing an azimuth angle and an elevation angle of the strike position on the imaging sensor of the camera; and computing the relative direction vector of the laser beam with respect to the camera based on the azimuth angle and the elevation angle.

In another aspect, the method further comprises converting the relative direction vector into the global coordinate direction vector based on the global orientation and the global position of the camera.

In another aspect, the method further comprises determining the global orientation of the camera using one of Euler angles, quaternions, an angle-axis representation, and a rotation matrix.

In another aspect, the method further comprises obtaining a three-dimensional model representation of the ground and determining where the laser is located on the ground based on the intersection of the global coordinate direction vector and the ground representation that comprises a three-dimensional model representation.

In another aspect, the determined position of the laser on the ground is a first position estimate and the method further comprises: determining on the imaging sensor of the camera a second strike position that is struck by the laser beam that is emitted from the laser; determining a second global orientation of the camera and a second global position of the camera when the imaging sensor is struck by the laser beam for a second time; computing a second relative direction vector of the second strike of the laser beam with respect to the camera; converting the second relative direction vector into a second global coordinate direction vector using the second global orientation and the second global position of the camera; determining a second position estimate of the laser on the ground based on an intersection where the second global coordinate direction vector intersects with the representation of the ground; and determining an updated estimate of the position of the laser on the ground based on the first position estimate and the second position estimate.

In another aspect, the method further comprises determining information about the laser beam comprising a time that the laser beam struck the imaging sensor of the camera and a wavelength of the light of the laser beam and transmitting the information to a remote entity.

In another aspect, the method further comprises converting the position on the ground of the laser into at least one of a street address and a map grid reference.

In another aspect, the method further comprises transmitting the time of the strike and at least one of a street address and the map grid reference to a remote entity.

In another aspect, the method further comprises determining the position on the ground of the laser that emitted the laser beam while the aircraft is in flight and transmitting the position on the ground of the laser to a remote entity while the aircraft is in flight.

One aspect is directed to a device configured to determine a position on the ground of a laser that emits a laser beam that strikes an aircraft. The device comprises a camera that detects a strike position of the laser beam on an imaging sensor of the camera. Processing circuitry is operatively connected to the camera. The device is configured to: compute a relative direction vector of the laser beam with respect to the camera based on the strike position; determine a global orientation of the camera and a global position of the camera; convert the relative direction vector into a global coordinate direction vector using the global orientation and the global position; and determine an intersection of the global coordinate direction vector and the representation of the ground as the position on the ground of the laser.

In another aspect, an exterior housing extends around each of the camera, orientation sensor, positioning sensor, and the processing circuitry and a mount is attached to the exterior housing to removably attach the device in a cockpit of the aircraft.

In another aspect, the camera is integrated into the aircraft and the global orientation and the global position of the camera are determined by one or more components integrated with the aircraft.

In another aspect, the device is further configured to determine: a horizontal pixel distance from a predetermined point of the imaging sensor to the strike position; a vertical pixel distance from the predetermined point to the strike position; an azimuth angle based on the horizontal pixel distance; and an elevation angle based on the vertical pixel distance.

In another aspect, the device is further configured to determine the global orientation of the camera using one of Euler angles, quaternions, an angle-axis representation, and a rotation matrix.

In another aspect, the device is further configured to: obtain an elevation above mean sea level of an airport in proximity to the aircraft; and determine the intersection of the global coordinate direction vector with the representation of the ground based on the elevation of the airport.

In another aspect, the intersection of the global coordinate direction vector and the representation of the ground is an estimated first intersection, with the device further configured to: determine that a second strike from the laser beam from the laser has subsequently struck the imaging sensor; determine a second global orientation of the camera and a second global position of the camera when the imaging sensor is struck by the laser beam for the second time; compute a second relative direction vector of the second strike from the laser beam with respect to the camera; convert the second relative direction vector into a second global coordinate direction vector using the second global orientation and the second global position; determine a second position estimate of the laser on the ground based on a second intersection where the second global coordinate direction vector intersects with the representation of the ground; and determine an updated position of the laser on the ground based on the first intersection position estimate and the second intersection position estimate.

In another aspect, the device is further configured to determine a time that the laser beam struck the aircraft and a wavelength of the laser beam.

In another aspect, the device is configured to transmit to a remote entity the position on the ground of the laser while the aircraft is in flight.

One aspect is directed to a non-transitory computer readable medium storing a computer program product to control a programmable computing device with the computer program product comprising software instructions that, when executed on processing circuitry of the programmable computing device, cause the processing circuitry to: determine a strike position from a camera that is located in a cockpit of an aircraft with the strike position comprising a position on an imaging sensor corresponding to where the laser beam strikes the camera on the aircraft; determine a global orientation of the camera and a global position of the camera; compute a relative direction vector of the laser beam with respect to the camera; convert the relative direction vector into a global coordinate direction vector using the global orientation and the global position of the camera; and determine a position on the ground of the laser that emitted the laser beam with the position comprising a point where the global coordinate direction vector intersects with the representation of the ground.

One aspect is directed to a system configured to determine a position of a laser that emits a laser beam. The system comprises: a first camera having a first imaging sensor and being located on or in a first aircraft with the first camera configured to detect a strike position of a first strike from laser beam from the laser on the first imaging sensor; a second camera having a second imaging sensor and being located on or in a second aircraft with the second camera configured to detect a strike position of a second strike from the laser beam from the laser on the second imaging sensor. The system further comprises a processing device of the system configured to: determine a global orientation of the first camera and the second camera and a global position of the first camera and the second camera; compute a relative direction vector of the first strike of the laser beam with respect to the first camera based on the strike position of the first strike of the laser beam on the first imaging sensor; convert the relative direction vector of the first strike of the laser beam into a first global coordinate direction vector using the global orientation and the global position of the first camera; compute a relative direction vector of the second strike of the laser beam with respect to the second camera based on the strike position of the second strike of the laser beam on the second imaging sensor; convert the relative direction vector of the second strike of the laser beam into a second global coordinate direction vector using the global orientation and the global position of the second camera; determine the position on the ground of the laser based on intersections of the global coordinate direction vectors of both of the first strike and the second strike of the laser beam and the representation of the ground.

In another aspect, the processing device of the system is located on one of the first aircraft and the second aircraft.

In another aspect, a processing device is located in both the first aircraft and the second aircraft.

In another aspect, the processing device of the system is located remotely from the first camera and the second camera.

In another aspect, the processing device is further configured to: convert the position of the laser into at least one of a street address and a map grid reference; and transmit the at least one street address and the map grid reference to a remote entity.

In another aspect, the processing device is further configured to determine the position of the laser on the ground while both of the first aircraft and the second aircraft are in flight and to transmit the position of the laser to a remote entity while the first aircraft and the second aircraft are in flight.

In another aspect, the processing device is further configured to: obtain an elevation of an airport above mean sea level in proximity to the first aircraft and the second aircraft; determine the intersections of the global coordinate direction vectors of both of the first strike and the second strike of the laser beam and a representation of the ground that is at the elevation of the airport; and determine the position of the laser based on the representation of the ground intersections of the global coordinate direction vectors.

One aspect is directed to a method of determining a position of a laser on the ground that emits a laser beam that strikes a first aircraft and a second aircraft. The method comprises: determining a first strike position of the laser beam on a first imaging sensor of a first camera with the first camera located in or on the first aircraft and the laser beam being emitted from the laser positioned on the ground; determining a first global orientation and a first global position of the first camera; computing a first relative direction vector of the first strike of the laser beam with respect to the first camera; converting the first relative direction vector into a first global coordinate direction vector; determining a first position estimate on the ground of the laser with the first position estimate comprising where the first global coordinate direction vector intersects with the representation of the ground; determining a second strike position of the laser beam on a second imaging sensor of a second camera with the second camera located in or on the second aircraft; determining a second global orientation and a second global position of the second camera; computing a second relative direction vector of the second strike of the laser beam with respect to the second camera; converting the second relative direction vector into a second global coordinate direction vector; determining a second position estimate on the ground of the laser with the second position estimate comprising where the second global coordinate direction vector intersects with the representation of the ground; and determining the position of the laser on the ground based on the first position estimate and the second position estimate.

In another aspect, determining the position of the laser on the ground based on the first position estimate and the second position estimate comprises combining the ground position estimates and creating an updated overall ground position estimate.

The features, functions and advantages that have been discussed can be achieved independently in various aspects or may be combined in yet other aspects, further details of which can be seen with reference to the following description and the drawings.

DETAILED DESCRIPTION

Figure 1:
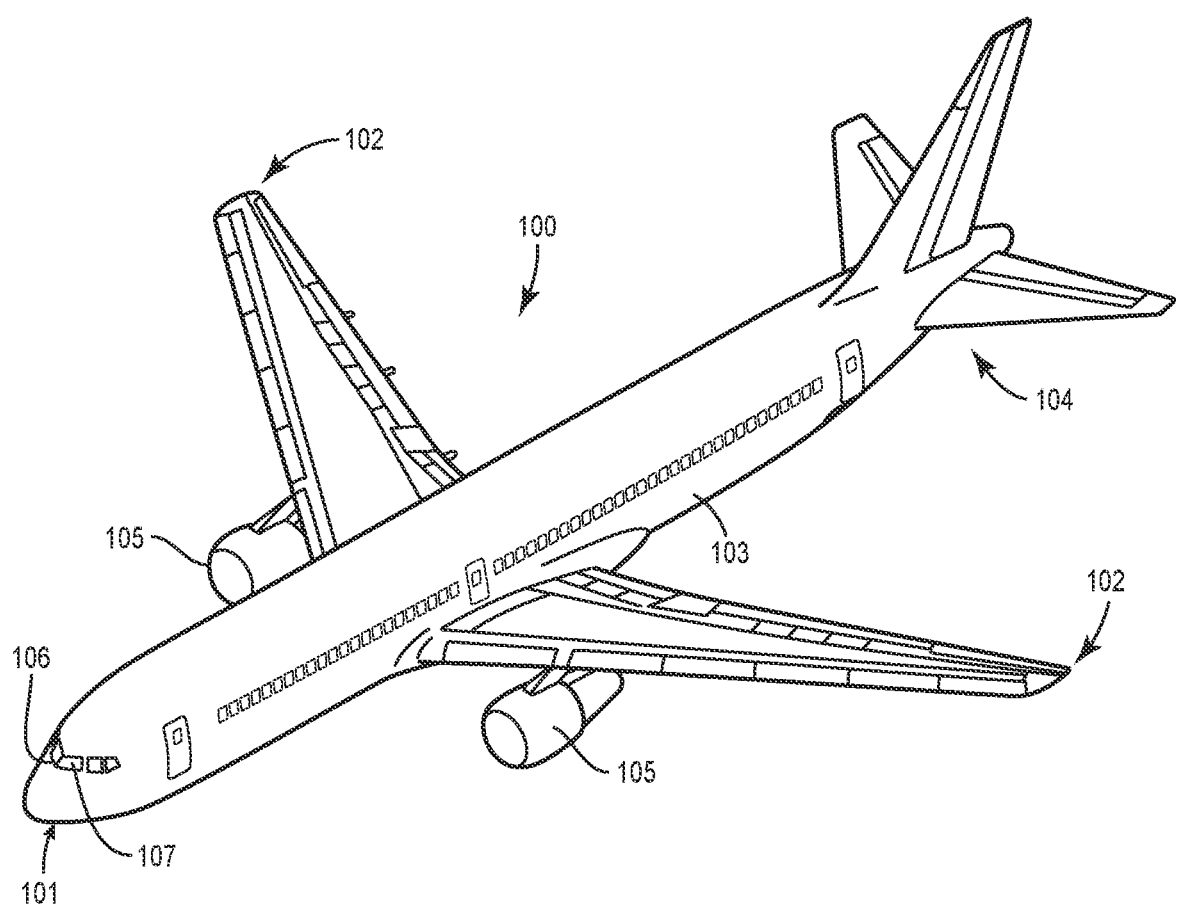
FIG. 1 is an isometric view of an aircraft.

FIG. 1 illustrates an aircraft 100 that is equipped with laser detection and localization functionality. The aircraft 100 includes a nose 101, wings 102, a fuselage 103, and an empennage tail 104. Engines 105 provide the power to propel the aircraft 100 during flight. The aircraft 100 includes a cockpit 106 located in proximity to the nose 101. The cockpit 106 includes the various instruments needed to operate the aircraft 100. The cockpit 106 also includes a windshield 107 to allow for the one or more pilots to look outward while controlling the aircraft 100.

Figure 2A:
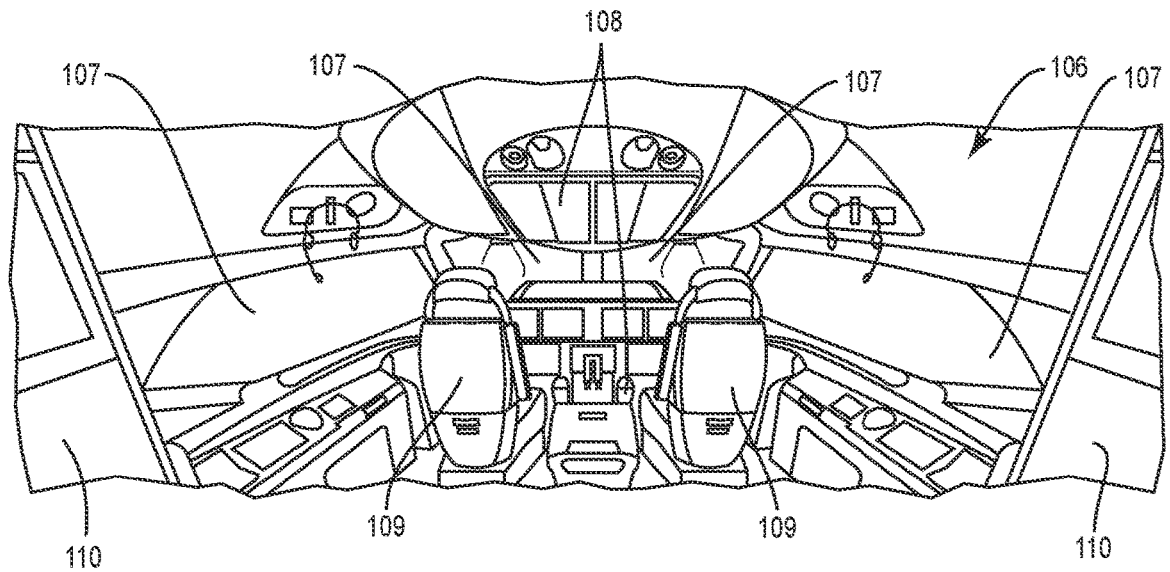
FIG. 2A is a perspective view of a front section of an interior of a cockpit.
Figure 2B:
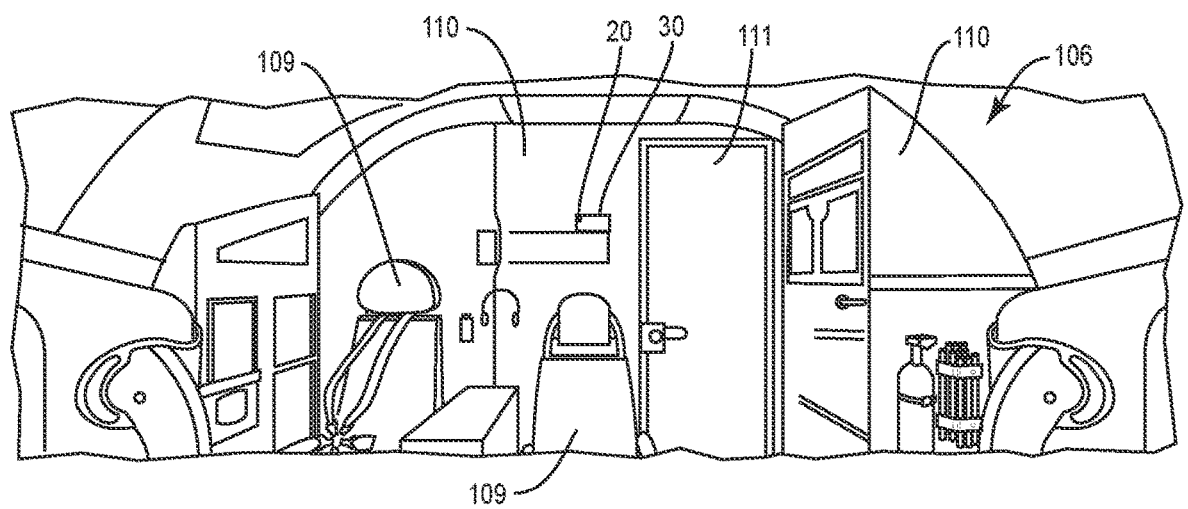
FIG. 2B is a perspective view of a rear section of the interior of the cockpit of FIG. 2A.

FIG. 2A illustrates a view from the cockpit 106 looking outward through the windshield 107. FIG. 2B illustrates a view of the rear of the cockpit 106. The cockpit 106 includes an enclosed area that is formed within the windshield 107 and interior walls 110. A door 111 extends through one of the interior walls 110 and leads into a cabin area of the fuselage 103. The cockpit 106 includes one or more seats 109 to accommodate the flight personnel such as a pilot and co-pilot. One or more control panels 108 include inputs and displays for controlling and monitoring the operation of the aircraft 100.

A camera 20 is located in or on the aircraft 100. In one example as illustrated in FIG. 2B, the camera 20 is located in the cockpit 106 and is configured to capture an image of the cockpit 106. In one example, the image includes a front of the cockpit 106 including the windshield 107. This positioning provides for the camera 20 to detect a laser beam 91 that enters into the cockpit 106 through the windshield 107. In one specific example, the image captured by the camera 20 is substantially the same as that illustrated in FIG. 2A. There may be some refraction of the laser beam 91 as it passes through the windshield 107 and enters into the cockpit 106. However, it has been determined that this does not significantly alter the beam direction and the methods disclosed herein are still effective to determine the position of the laser 90 on the ground.

Figure 3A:
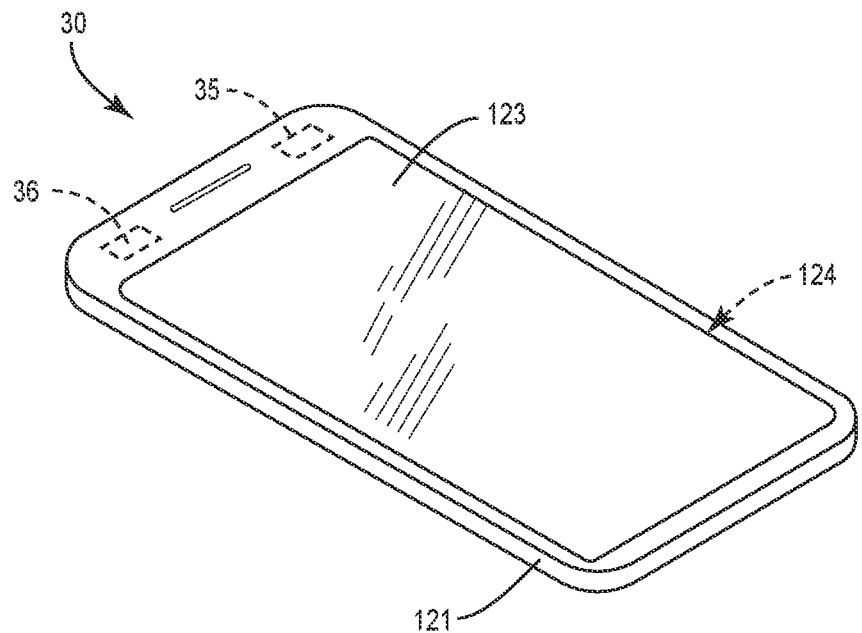
FIG. 3A is an isometric view of a smartphone device.
Figure 3B:
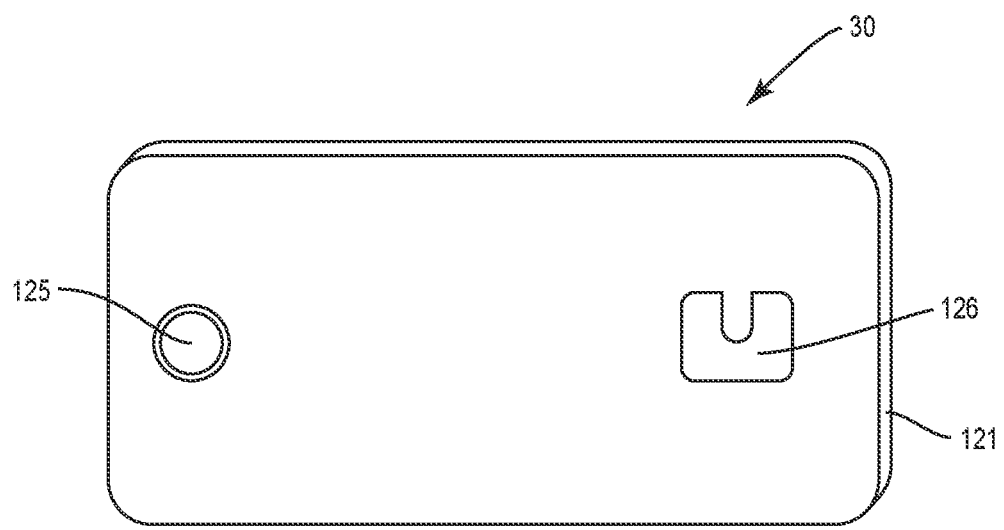
FIG. 3B is a rear orthographic view of the smartphone device of FIG. 3A.

In one example as illustrated in FIGS. 3A and 3B, the camera 20 is incorporated within a computing device 30. The computing device 30 can include various shapes and sizes. In one example as illustrated, the computing device 30 is a hand-held device such as a smartphone device. In this example, the computing device 30 includes an exterior housing 121 that extends around and forms an interior space 124. The interior space 124 is sized to hold the camera 20. The housing 121 can include an opening that accommodates a lens 125 of the camera 20. Lens 125 focuses light onto the camera's imaging sensor 21 (not illustrated). In one example as illustrated in FIG. 3B, the lens 125 is exposed on the backside of the housing 121. A filter (not illustrated) can be incorporated with the lens 125 to control an amount of light and to reduce false positives of laser strikes. A mount 126 on part of the housing 121 provides for attaching the computing device 30 within the cockpit 106, such as to one of the interior walls 110 or seats 109.

The computing device 30 includes an inertial measurement unit (IMU) 35. The IMU 35 includes one or more sensors that measure a variety of factors including but not limited to speed, direction, acceleration, specific force, and angular rate. The IMU 35 includes various sensors, including but not limited to a 3-axis accelerometer, a 3-axis gyroscope, and a magnetometer. Based on the sensor readings, the computing device 30 determines a roll, pitch, and yaw of the camera 20. The computing device 30 also includes a GPS unit 36 to determine a global position of the camera 20. In one example, the GPS unit 36 determines the latitude, longitude, and altitude of the camera 20.

The computing device 30 is configured to detect a position on the ground 80 of a laser 90 that is emitting a laser beam 91 that strikes the cockpit 106 of the aircraft 100. FIG.

Figure 4A:
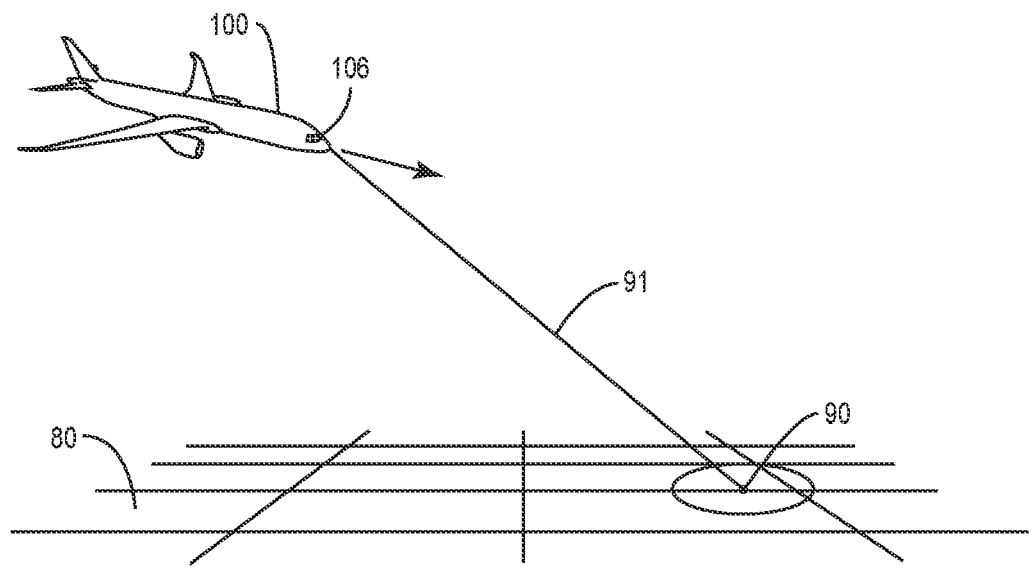
FIG. 4A is a schematic diagram of an aircraft being struck by a laser beam that is emitted from a laser.
Figure 4B:
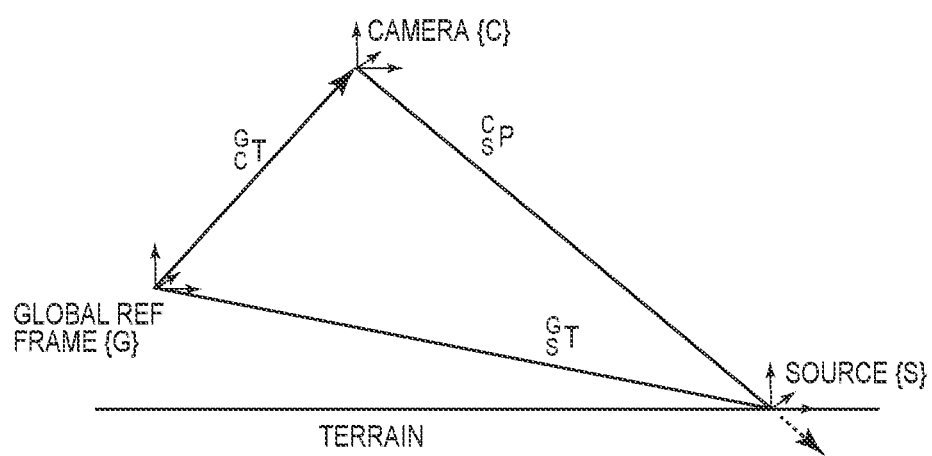
FIG. 4B is a vector diagram describing coordinate systems used in determining a position on the ground of a laser.

4A illustrates an aircraft 100 during flight at elevation above the ground 80. A laser 90 positioned on the ground 80 emits a laser beam 91 that strikes the aircraft 100 at the cockpit 106. FIG. 4B is a vector diagram describing coordinate system reference frames, transformations between the reference frames, and the global coordinate direction vector.

Figure 5A:
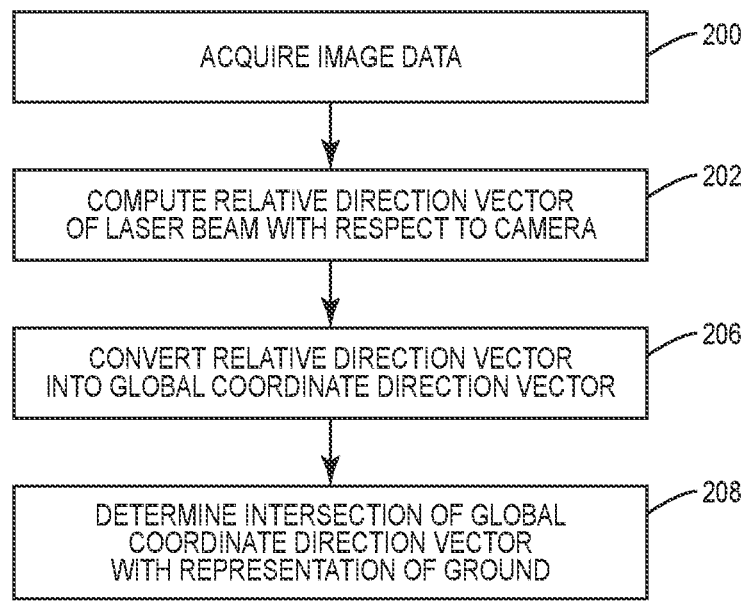
FIG. 5A is a flowchart diagram of a method of determining a position of a laser that emits a laser beam that strikes an aircraft.

FIG. 5A illustrates a method of determining the position of the laser 90 on the ground 80. The computing device 30 receives image data from the camera 20 (block 200). The image data includes a position where the laser beam 91 strikes an imaging sensor 21 of the camera 20. The computing device 30 computes the relative direction vector of the laser beam 91 with respect to the camera 20 (block 202). The relative directional vector of the camera 20 is converted into global coordinates (block 206). The computing device 30 then determines the intersection of the global coordinate direction vector with the representation of the ground 80 to determine the position of the laser 90 (block 208).

Figure 5B:
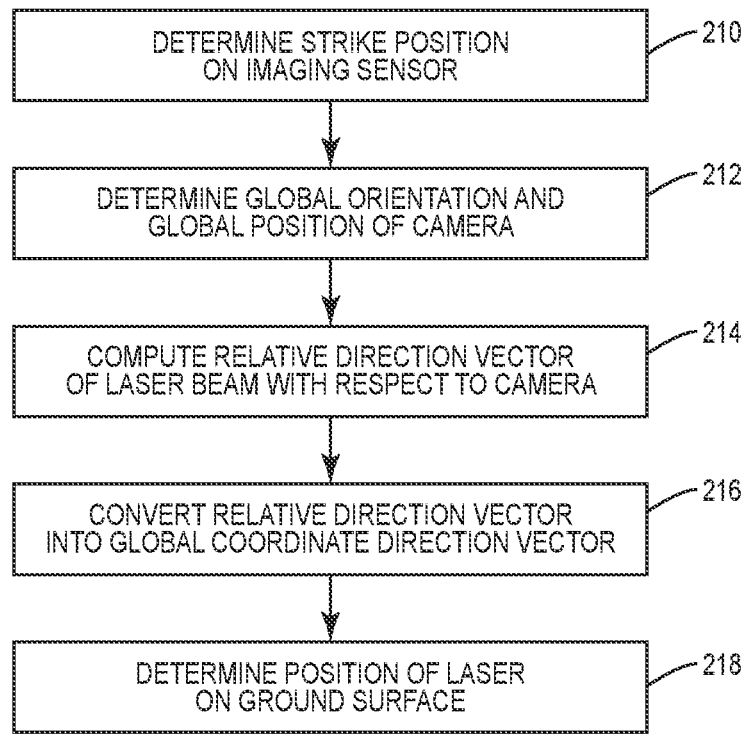
FIG. 5B is a flowchart diagram of a method of determining a position of a laser that emits a laser beam that strikes an aircraft.

FIG. 5B illustrates another method of determining the position of the laser 90 on the ground 80. The method includes determining a strike position that includes a position on an imaging sensor 21 corresponding to where the laser beam strikes the aircraft (block 210). The computing device 30 determines a global orientation of the camera 20 and a global position of the camera 20 (block 212). The computing device 30 device computes a relative direction vector of the laser beam 91 with respect to the camera 20 (block 214). The relative direction vector is converted into a global coordinate direction vector using the global orientation and the global position of the camera 20 (block 216). A position of the laser 90 on the ground is determined that includes a point where the global coordinate direction vector intersects with the representation of the ground (block 218).

Figure 6:
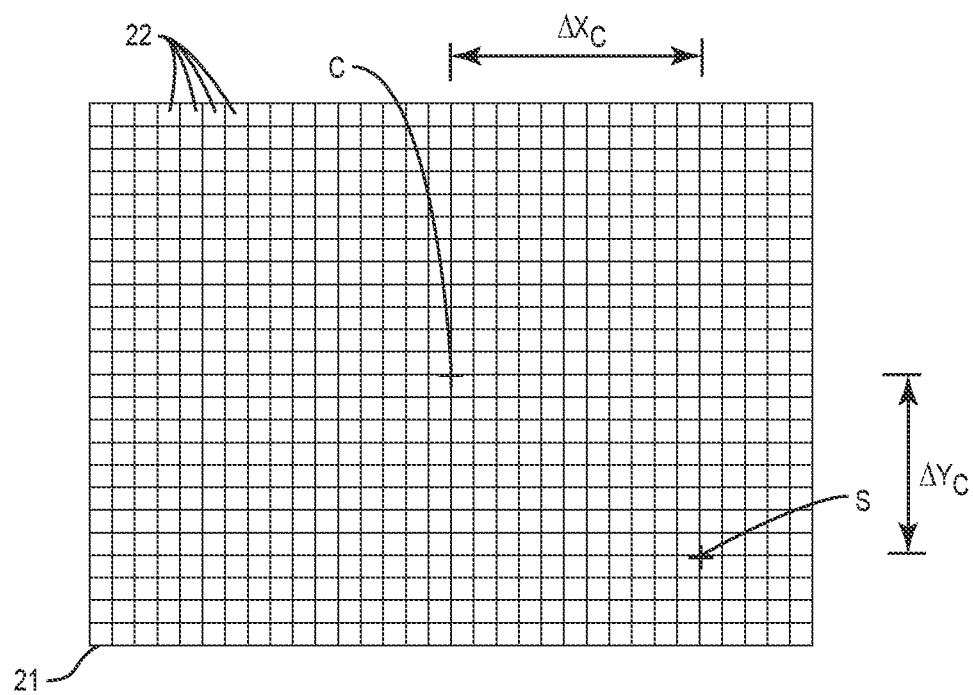
FIG. 6 is a schematic diagram of an imaging sensor of a camera with a center of the imaging sensor and a strike position of a laser beam.

Acquiring the image data includes obtaining information about the camera 20 and then determining the position of the strike of the laser beam 91 with respect to the imaging sensor 21 of the camera 20. FIG. 6 illustrates an imaging sensor 21 that corresponds to a captured field of view of the camera 20. In one example, the field of view includes a portion of the interior of the cockpit 106 including the windshield 107. The imaging sensor 21 is defined by columns and rows of pixels 22. The number of pixels 22 depends upon the resolution of the camera 20. As illustrated, the camera 20 defines a predetermined point on the imaging sensor 21. FIG. 6 includes the predetermined point being a center C of the imaging sensor 21, although other examples can include different positions on the imaging sensor 21. At the time of the laser beam strike, a position is determined on the imaging sensor 21 where the laser beam 91 strikes. When more than one pixel 22 is struck by the laser beam 91, an average position can be used as the strike position. Further, a horizontal pixel distance $\Delta X_C$ and a vertical pixel distance $\Delta Y_C$ from the center C to the strike position S is determined. The localization method running on the computing device 30 further determines a horizontal pixel resolution ResX and a vertical pixel resolution ResY from the specification of the imaging sensor 21. The localization method running on the computing device 30 also determines the horizontal field-of-view (FovX) and vertical field-of-view (FovY) from the specifications of the imaging sensor 21.

The localization method running on the computing device 30 determines an azimuth angle α and an elevation angle β of the strike position of the laser beam 91 with respect to the imaging sensor 21. The azimuth angle α is computed according to the following:

$$\alpha = \Delta X_C * \text{FovX} / \text{ResX} \qquad \text{(Eq. 1)}$$

The elevation angle β is computed according to the following:

$$\beta = \Delta Y_C * \text{FovY} / \text{ResY} \qquad \text{(Eq. 2)}$$

Together these two angles (α, β) calculated by the localization method running on the computing device 30, define the relative direction vector to the laser 90 with respect to the camera 20. The azimuth angle α and an elevation angle β are then used to create a three by three (3×3) rotation matrix that defines the orientation based on the relative direction vector of the laser beam 91 with respect to the camera 20:

$$^C_S R = \begin{bmatrix} \cos(\beta)*\cos(\alpha) & -\sin(\alpha) & \cos(\alpha)*\sin(\beta) \\ \cos(\beta)*\sin(\alpha) & \cos(\alpha) & \sin(\beta)*\sin(\alpha) \\ -\sin(\beta) & 0 & \cos(\beta) \end{bmatrix} \qquad \text{(Eq. 3)}$$

where $^C_S R$ is the 3×3 rotation matrix describing the rotation of the coordinate system reference frame from the laser 90 {S} relative to the camera 20 {C} reference frame.

Post multiplying the rotation matrix by a unit vector in the X-direction $[1,0,0]^T$ gives the relative direction vector of the laser 90 defined in the reference frame of the camera 20:

$$^C_S P [\cos(\beta)*\cos(\alpha) -\sin(\alpha)\cos(\alpha)*\sin(\beta)]^T \qquad \text{(Eq. 4)}$$

where $^C_S P$ is the 3×1 direction vector describing the position of the laser 90 {S} relative to the camera 20 [C] reference frame.

The computing device 30 converts the relative direction vector of the laser beam 91 with respect to the camera 20 into global coordinates. This computation includes a transformation matrix that uses the global position of the camera 20 (Px, Py, Pz) determined from the GPS unit 36 and the relative orientation of the camera 20 determined from the IMU 35 which can be expressed in different formats, such as but not limited to roll angle A, pitch angle α, and yaw angle C. This transformation matrix formulation is:

$$^G_C T = \begin{bmatrix} \cos(B)*\cos(C) & \cos(C)*\sin(A)*\sin(B)-\cos(A)*\sin(C) & \sin(A)*\sin(C)+\cos(A)*\cos(C)*\sin(B) & Px \\ \cos(B)*\sin(C) & \cos(A)*\cos(C)+\sin(A)*\sin(B)*\sin(C) & \cos(A)*\sin(B)*\sin(C)-\cos(C)*\sin(A) & Py \\ -\sin(B) & \cos(B)*\sin(A) & \cos(A)*\cos(B) & Pz \\ 0 & 0 & 0 & 1 \end{bmatrix} \qquad \text{(Eq. 5)}$$

where $^G_C T$ is the 4×4 homogenous transformation matrix describing location (i.e., the position and orientation) of the camera 20 [C] reference frame relative to the global {G} reference frame.

Using this transformation matrix and the relative direction vector of the laser beam 91 with respect to the camera 20, the direction vector defined in the global reference frame is determined according to the following equation:

$$^G_S P = ^G_C T * ^C_S P \qquad \text{(Eq. 6)}$$

Where $^C_S P$ has been modified to be compatible with 4×4 transformation matrix multiplication by adding one more row at the end set to 1: $^C_S P = [^C_S P^T, 1]^T$ to make a 4×1 vector before post multiplying $^G_C T$.

FIG. 4B is a vector diagram showing the relationship of the coordinate system reference frames from the laser source frame {S}, camera frame {C}, and global frame {G}, as well as the coordinate transformation matrices T and direction vector P.

With the calculated direction vector of the laser beam 91 defined relative to the global reference position of the camera 20, the position of the laser 90 on the ground is determined by the intersection of the vector with the ground. The ground includes the ground surface as well as various objects that extend from the ground and in which the laser 90 can be located such as a building, tower, bridge, etc.

In one example, the computing device 30 uses the ground elevation above mean sea level. This can include the elevation of an airport in the vicinity of the aircraft 100, such as the elevation of the airport from which the aircraft took off from the elevation of the airport where the aircraft 100 is scheduled to land. The elevation of the airport can be saved in the memory circuitry 32 of the computing device 30 or can be determined at the time of the laser strike as part of the process of determining the position of the laser 90.

Figure 7:
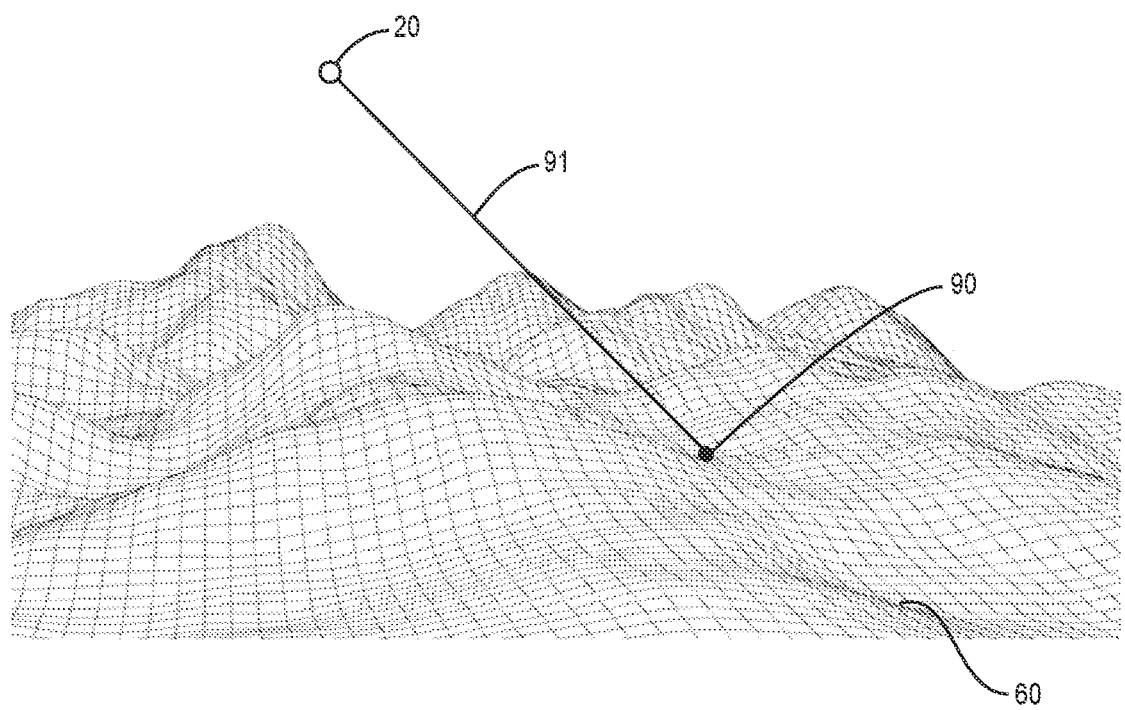
FIG. 7 is a schematic diagram of a vector intersecting with a point on a three-dimensional terrain model.

In one example, the ground is determined using a three-dimensional (3D) model representation 60 of the local terrain. FIG. 7 illustrates an example with the global coordinate direction vector of the laser beam 91 positioned relative to the global reference position of the camera 20. The intersection of the global coordinate direction vector and the 3D model representation 60 is the position of the laser 90 on the ground 80. The representation of the 3D model provides for the determination of global 3D coordinates of the position of the laser 90 including the ground latitude, ground longitude, and altitude. The position of the laser 90 can be determined using a vector-to-polygon intersection methodology such as a ray-to-triangle intersection algorithm. In one example, the 3D model representation 60 includes the ground as well as objects, such as buildings, towers, bridges, etc. Using the 3D model representation 60, the intersection point can be determined to be located on one of the objects. The position of the laser 90 on the 3D model representation 60 is converted using reverse geocoding into more specific aspects of the map, such as a street address, landmark, etc.

In one example, the 3D model representation 60 includes a topographical map of the terrain where the laser 90 is determined to be located. Additionally or alternatively, the 3D model representation 60 includes geographical information system (GIS) data.

The location information determined by the computing device 30 is forwarded to the authorities to help find the person responsible for the laser strike. Additionally or alternatively, the computing device 30 communicates the location with other aircraft 100 in the area. The other aircraft 100 can use this information to be prepared for a possible laser strike themselves and/or to further determine the location of the laser 90 on the ground to lead to capture of the person responsible.

The computing device 30 also maintains information regarding the laser strike that can be used to determine the location and/or used for prosecution of the person responsible. The camera 20 can capture different aspects about the laser beam 91, such as but not limited to a composite image of the laser strike, the time of the laser strike, and the wavelength of the light of the laser beam 91.

Figure 8:
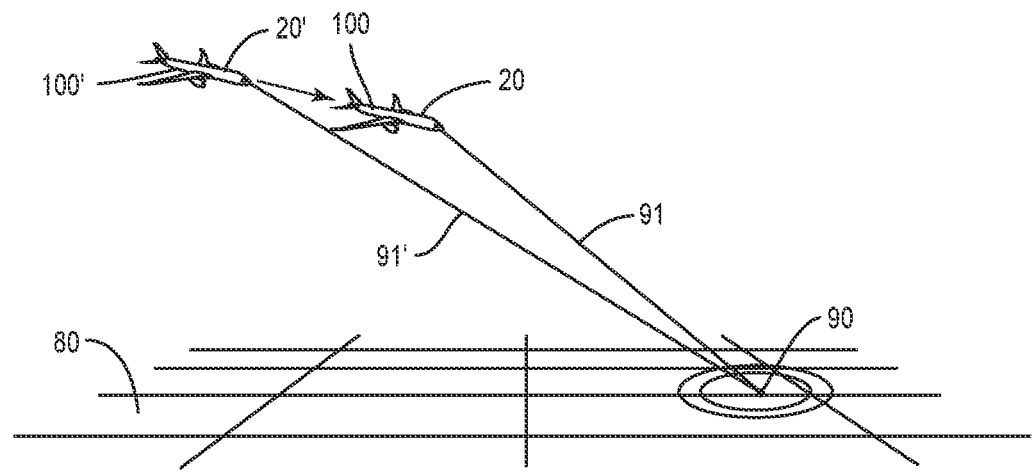
FIG. 8 is a schematic diagram of an aircraft struck by a laser beam from a laser that is located on the ground.
Figure 9:
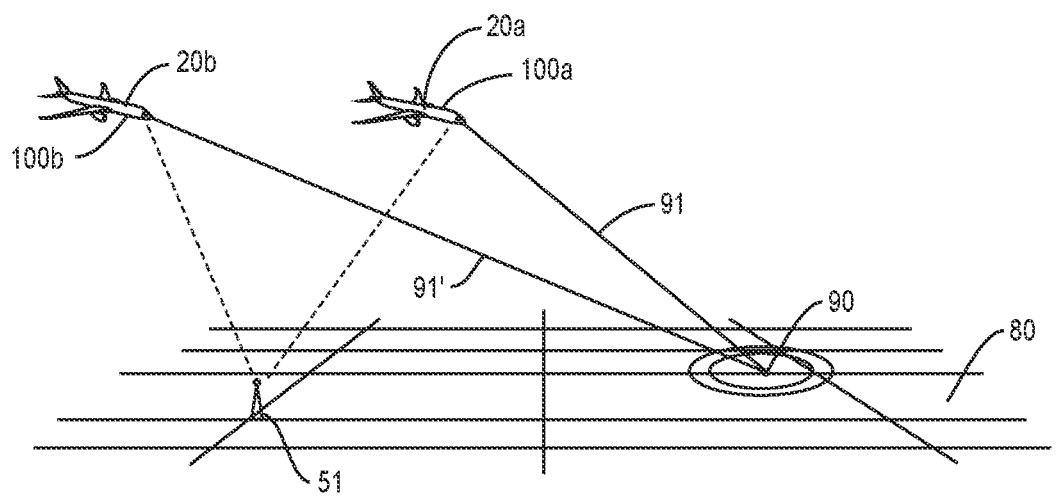
FIG. 9 is a schematic diagram of multiple aircraft struck by a laser beam from a laser located on the ground.

Detecting multiple laser strikes can improve the accuracy of determining the position of the laser 90 on the ground 80. FIG. 8 illustrates an example in which a single aircraft 100 detects at a first time a first laser strike from a laser beam 91. At some time thereafter, the same aircraft 100' records a subsequent second laser strike from the laser beam 91'. FIG. 9 illustrates an example in which two separate aircraft 100a, 100b experience laser strikes from a laser 90 with laser beam 91 striking the first aircraft 100a and laser beam 91' striking the second aircraft 100b. The laser beam 91, 91' is emitted from a laser 90. In the various examples, the timing between the laser strikes can vary.

Figure 10:
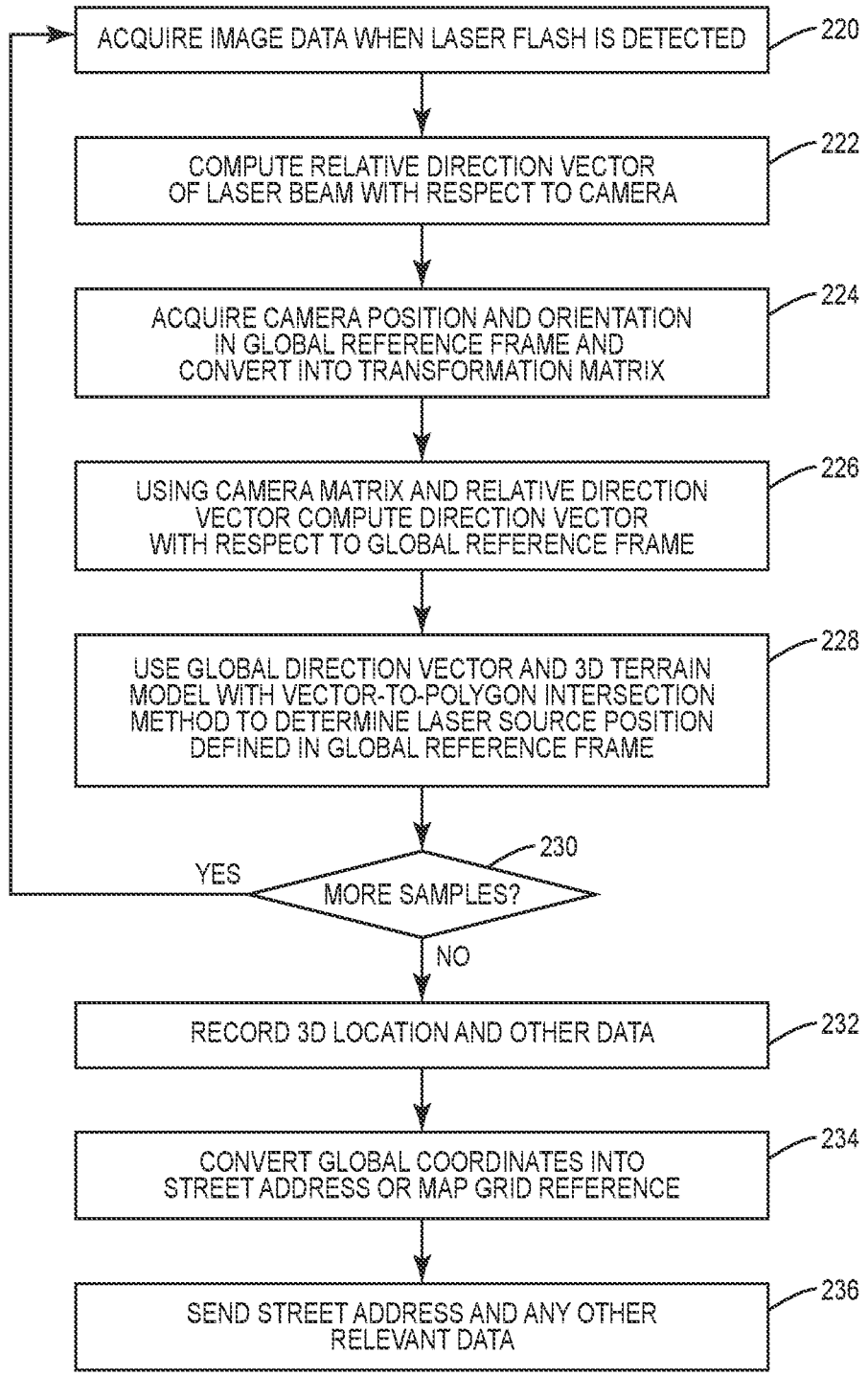
FIG. 10 is a flowchart diagram of a method of determining a position on the ground of a laser based on a laser strike.

FIG. 10 illustrates a method of determining a position of a laser 90 on the ground. The method includes acquiring image data when a laser flash is detected by an imaging sensor 21 of the camera 20 (block 220). The computing device 30 computes a relative direction vector of the laser beam 91 with respect to the camera 20 (block 222). The position of the camera 20 and the orientation of the camera 20 in a global reference frame is determined and converted into a transformation matrix (block 224). Using the transformation matrix and the relative direction vector of the laser 90, the computing device 30 computes the global coordinate direction vector of the laser beam 91 with respect to the global reference frame (block 226). The computed global direction vector of the laser beam 91 is used with a 3D model representation 60 of the ground 80 with a vector-to-polygon intersection method to determine a position of the laser 90 defined in terms of the global reference frame (block 228). If more laser strikes are detected, additional calculations are performed to determine and refine the position of the laser 90 on the ground (block 230).

If there are no additional laser strikes, the determined position of the laser 90 on the ground is recorded relative to the 3D model representation 60 (block 232). The global coordinates of the laser 90 are converted into a street address or map grid reference (block 234) which is then forwarded (block 236). This can include but is not limited to forwarding the information to the authorities, other aircraft 100, and airport security.

In one example when multiple laser strikes are detected by the same or different aircraft 100, the calculated positions of the laser 90 are considered estimates of the position. The estimates are averaged to determine the position of the laser 90 on the ground 80. In another example, the overall calculated position of the laser 90 on the ground 80 is determined by combining the data from the different estimates and computing the mean.

Figure 11:
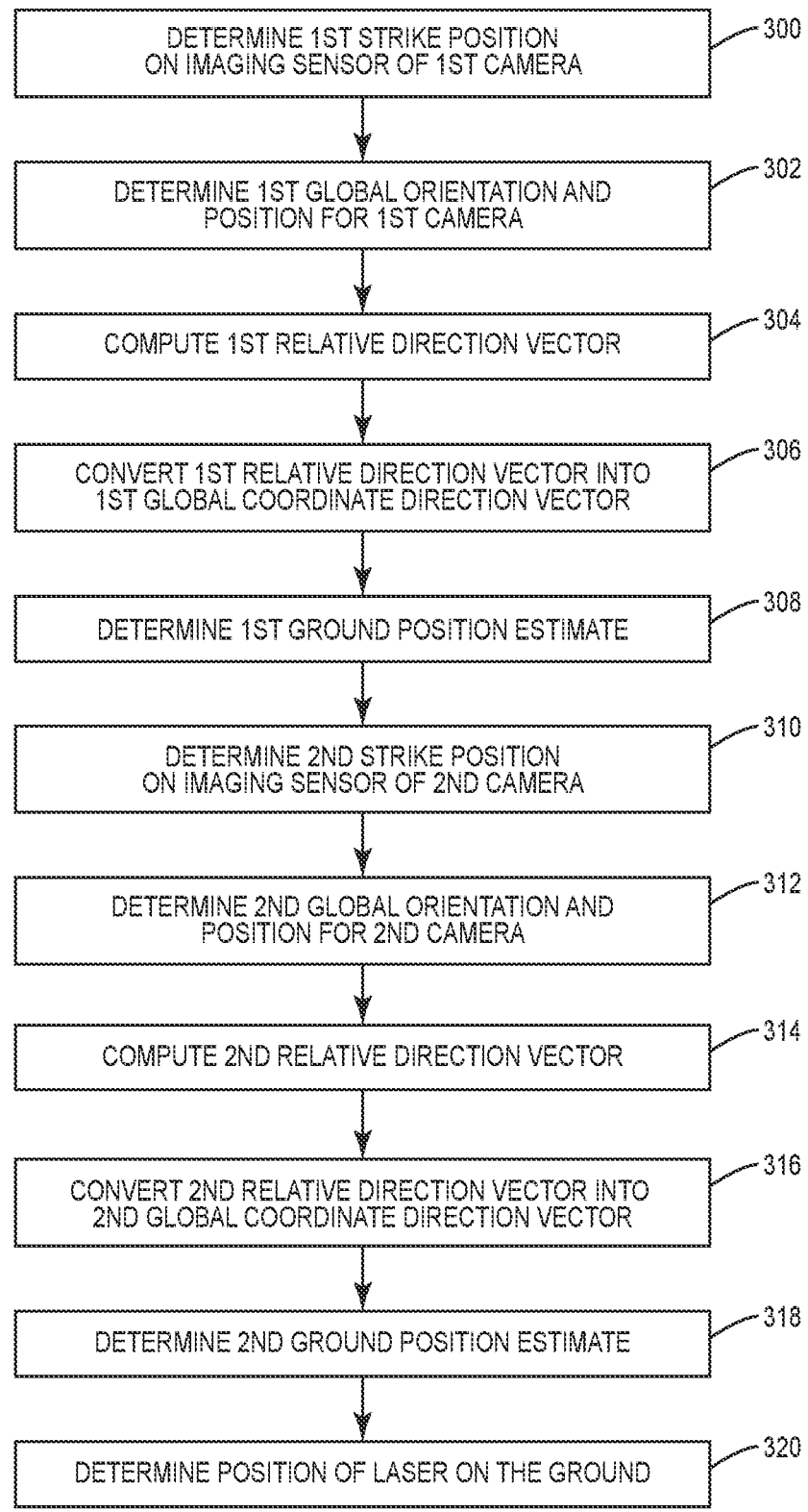
FIG. 11 is a flowchart diagram of a method of determining a position of a laser on the ground based on laser strikes on multiple aircraft.

FIG. 11 illustrates a method of determining a position of a laser 90 that emits a laser beam 91 that strikes a first aircraft 100a and a second aircraft 100b. The method includes determining a first strike position of the laser beam 91 on a first imaging sensor 21a of a first camera 20a (block 300). The first camera 20a is located in or on the first aircraft 100a and the laser beam 91a being emitted from the laser 90 positioned on a ground of the ground 80. A first global orientation and a first global position is determined for the first camera 20a (block 302). A first relative direction vector of the first strike of the laser beam 91 with respect to the first camera 20a is computed (block 304) and converted into a first global coordinate direction vector (block 306). The method determines a first position estimate on the ground of the laser 90 that includes where the first global coordinate direction vector intersects with the representation of the ground (block 308). The method further includes determining a second strike position of the laser beam 91 on a second imaging sensor 21b of a second camera 20b (block 310). The second camera 20b is located in or on the second aircraft 100b. A second global orientation and a second global position of the second camera 20b is determined (block 312). A second relative direction vector of the second strike of the laser beam 91 with respect to the second camera 20b is computed (block 314) and converted into a second global coordinate direction vector (block 316). The method determines a second position estimate on the ground of the laser 90 that includes where the second global coordinate direction vector intersects with the representation of the ground (block 318). The method determines the position of the laser 90 on the ground based on the first position estimate and the second position estimate (block 320).

Figure 12:
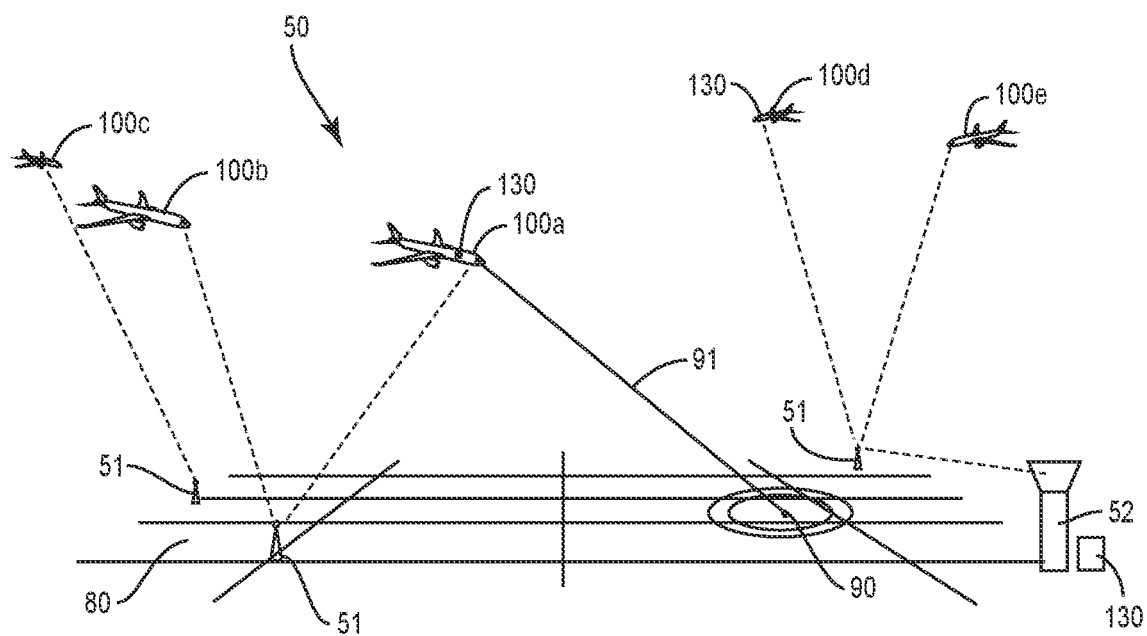
FIG. 12 is a schematic diagram of a communications network for communications regarding the position of a laser.

FIG. 12 illustrates a communications network 50 through which the computing device 30 and/or aircraft 100 communicates with remote entities such as other aircraft 100 and ground-based entities 52. The communications network 50 includes one or more base stations 51 that receive the signals from the aircraft 100a-100e. The ground stations 52 can include various entities, such as but not limited to an air traffic control tower, a headquarters facility, etc.

Figure 13:
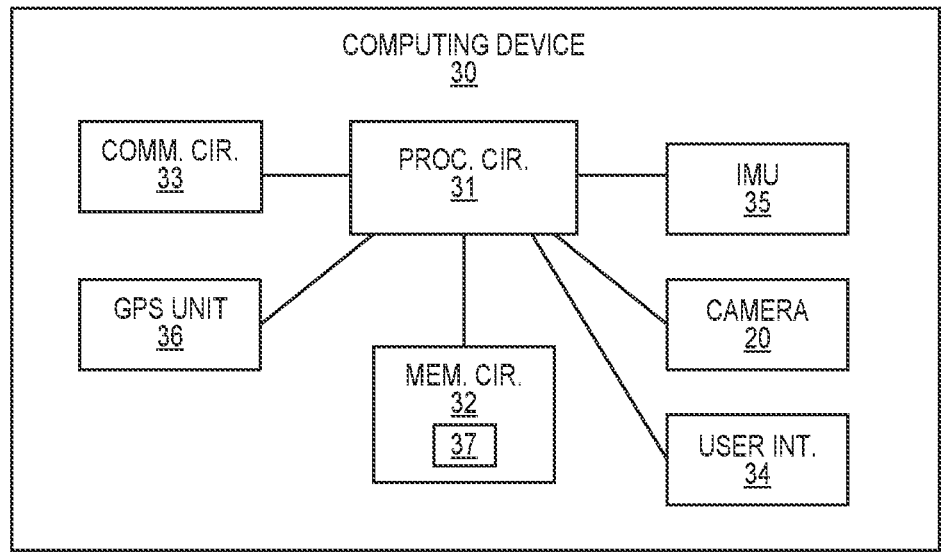
FIG. 13 is a schematic diagram of a smartphone device.

FIG. 13 illustrates a block diagram of a computing device 30. The computing device 30 includes processing circuitry 31 communicatively coupled via one or more buses to memory circuitry 32 and interface circuitry 33. According to various aspects of the present disclosure, processing circuitry 31 includes one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, the processing circuitry 31 includes programmable hardware capable of executing software instructions stored, e.g., as a machine-readable computer control program 37 in the memory circuitry 32.

In one example, the processing circuitry 31 is configured to execute the control program 37 to determine the location of the laser 90 on the ground according to the processes disclosed herein. In addition, processing circuitry 31 is also configured to communicate information including the location of the laser 90 on the ground between the computing device 30 and ground-based entities 52.

The computing device 30 includes software for operations such as to send and receive calls, messages, texts, emails, etc. The software also provides for access to various wireless networks to provide for the communication. Software further provides for operation of the various components (e.g., camera 20, IMU 35, GPS unit 36). The software can also provide for 3D localization equations, use of image data from multiple sources, and the output of ground position estimates of the laser 90.

Memory circuitry 32 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. The memory circuitry 32 is configured to store various files for use in the process as well as the control program 37.

Communication circuitry 33 comprises circuitry configured to control the input and output (I/O) data paths of the computing device 30. The I/O data paths include data paths for exchanging signals with other computers and mass storage devices over a communications network (not shown). The communications can be to one or more of the aircraft 100 and the remote entities 52.

User interface circuitry 34 comprises input/output circuits and devices configured to allow a user to interface with the computing device 30. Such circuitry and devices include but is not limited to a display 123 such as a Liquid Crystal Display (LCD) and/or a Light Emitting Diode (LED) display for presenting visual information to a user, one or more graphics adapters, display ports, video buses, a touchscreen, a graphical processing unit (GPU), and audio output devices such as speakers. In some aspects of the present disclosure, interface circuitry 34 includes circuitry and devices for accepting input from a user. Such circuitry and devices include a pointing device (e.g., a mouse, stylus, touchpad, trackball, pointing stick, joystick), a microphone (e.g., for speech input), an optical sensor (e.g., for optical recognition of gestures), and/or a keyboard with input 122 (e.g., for text entry).

According to particular aspects of the present disclosure, interface circuitry 34 is implemented as a unitary physical component, or as a plurality of physical components that are contiguously or separately arranged, any of which may be communicatively coupled to any other or communicate with any other component via the processing circuitry 31.

The camera 20 includes the imaging sensor, lens and related circuitry to capture the image data. The IMU 35 determines the orientation of the camera 20 and/or computing device 30. In one example, the IMU 35 includes a combination of one or more accelerometers, gyroscopes and magnetometers. The GPS unit 36 is configured to determine the global position of the computing device 30. In one example, the GPS unit 36 is also configured to determine an altitude.

In one example, the computing device 30 is a handheld unit such but not limited to a cell phone, lap top computer, and personal digital assistant (PDA). FIGS. 3A and 3B illustrate one specific example of a computing device 30 configured as a smartphone device. The computing device 30 is a stand-alone device configured to be attached in the cockpit 106 and used during a flight. The computing device 30 can then be removed from the cockpit 106 and transported and used with other aircraft 100.

Figure 14:
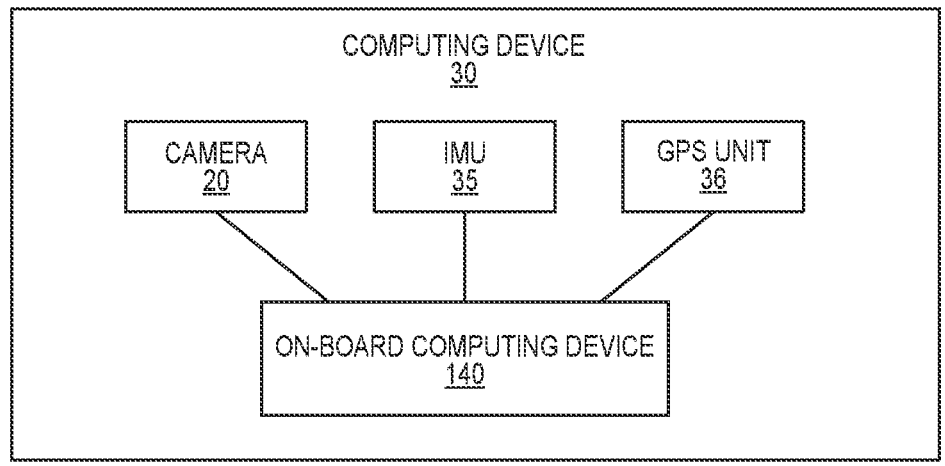
FIG. 14 is a schematic diagram of a computing device.

In another example, the computing device 30 is integrated within the aircraft 100. FIG. 14 illustrates an example in which the computing device 30 consists of an on-board computing device 140 that may be integrated with the aircraft 100. In one example, the on-board computing device 140 is a flight control unit that operates the aircraft 100 or navigation unit that controls the navigation of the aircraft 100 during flight. The on-board computing device 140 is accessed and controlled by the one or more pilots through one or more controls on the control panel 108 (see FIG. 2). In this example, the on-board computing device 140 includes processing circuitry, memory circuitry, and interface circuitry for the determination of the position of the laser 90. The camera 20 is a separate component that is mounted in the cockpit 106 and provides signals to the on-board computing device 140. The IMU 35 and GPS unit 36 are separate components that are integrated with the flight control unit for the operation of the aircraft 100 and communicate with the on-board computing device 140.

Figure 15:
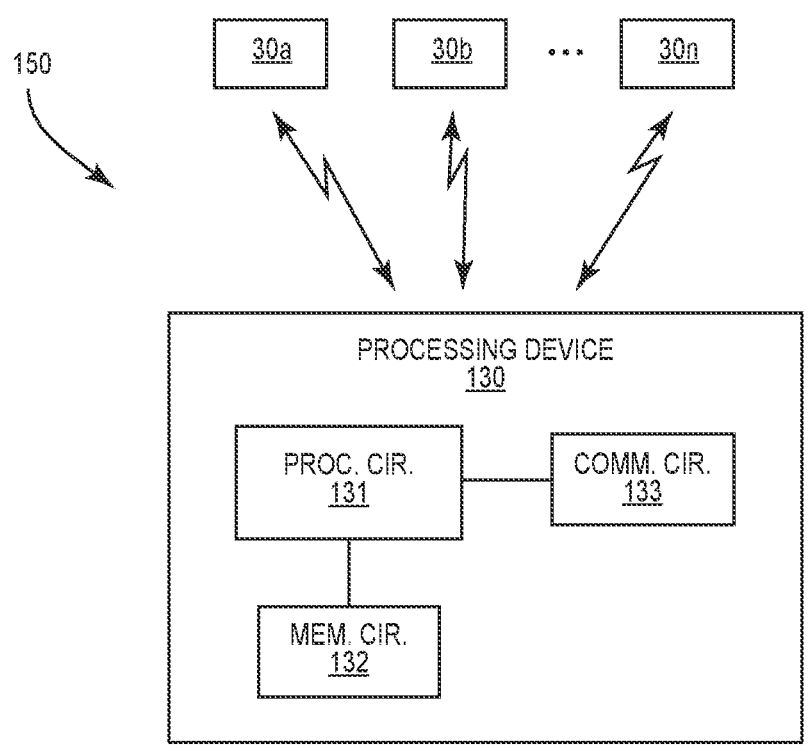
FIG. 15 is a schematic diagram of a system that includes one or more computing devices and a processing device.

One or more computing devices 30 can be included within a system 150 for determining the position on the ground of the laser 90. FIG. 15 includes a system 150 that includes one or more computing devices 30 and a processing device 130. The processing device 130 receives strike data from the one or more computing devices 30 and uses the data to calculate the position on the ground of the laser 90. The processing device 130 can be located at various locations on the ground 80 and/or in an aircraft 100 (see FIG. 12). In one example, an aircraft 100 can include a computing device 30 for detecting the strike, and a processing device 130 for calculating the position on the ground of the laser 90. The processing device 130 includes processing circuitry 131, memory circuitry 132, and communications circuitry 133 configured to receive the data from the one or more computing devices 30 and calculate the position.

In one example disclosed above, the orientation of the camera 20 is determined using Euler angles including the roll angle, pitch angle, and yaw angle of the camera 20. Other examples of determining the orientation of the camera 20 use different methods such as but not limited to quaternions, an angle-axis representation, and as a 3×3 rotation matrix.

The examples disclosed above disclose the use of a single camera 20. In another example, multiple cameras 20 detect strike positions of the laser beam 91 on their respective imaging sensors 21. The computing device 30 receives the location information from two or more cameras 20 and computes the various vectors and intersection points. In one example, the computing device 30 averages the intersection of the different vectors with the representation of the ground to determine the position on the ground of the laser 90.

This methodology can be used to determine a laser strike on a variety of aircraft 100. Examples of aircraft 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, and combinations thereof.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a position of a laser on the ground that emits a laser beam that strikes an aircraft, the method comprising:
    determining a strike position of the laser beam on an imaging sensor of a camera with the camera positioned in or on the aircraft and the laser beam being emitted from the laser on the ground and aimed at the aircraft wherein the position of the laser on the ground is unknown to persons on the aircraft when the laser beam is emitted and strikes the aircraft;
    computing a relative direction vector of the laser beam with respect to the camera;
    converting the relative direction vector into a global coordinate direction vector; and
    determining the position on the ground of the laser that emitted the laser beam, the position comprising where the global coordinate direction vector intersects with a ground representation.

2. The method of claim 1, wherein computing the relative direction vector of the laser beam with respect to the camera comprises:
    determining a global position of the camera and a global orientation of the camera;
    computing an azimuth angle and an elevation angle of the strike position on the imaging sensor of the camera; and
    computing the relative direction vector of the laser beam with respect to the camera based on the azimuth angle and the elevation angle.

3. The method of claim 2, further comprising converting the relative direction vector into the global coordinate direction vector based on the global orientation and the global position of the camera.

4. The method of claim 3, further comprising determining the global orientation of the camera using one of Euler angles, quaternions, an angle-axis representation, and a rotation matrix.

5. The method of claim 1, further comprising:
    obtaining a three-dimensional model representation of the ground; and
    determining where the laser is located on the ground based on the intersection of the global coordinate direction vector and the ground representation that comprises a three-dimensional model representation.

6. The method of claim 1, wherein the determined position of the laser on the ground is a first position estimate, the method further comprising:
    determining on the imaging sensor of the camera a second strike position that is struck by the laser beam that is emitted from the laser;
    determining a second global orientation of the camera and a second global position of the camera when the imaging sensor is struck by the laser beam for a second time;
    computing a second relative direction vector of the second strike of the laser beam with respect to the camera;
    converting the second relative direction vector into a second global coordinate direction vector using the second global orientation and the second global position of the camera;
    determining a second position estimate of the laser on the ground based on an intersection where the second global coordinate direction vector intersects with the representation of the ground; and
    determining an updated estimate of the position of the laser on the ground based on the first position estimate and the second position estimate.

7. The method of claim 1, further comprising:
    determining information about the laser beam comprising a time that the laser beam struck the imaging sensor of the camera and a wavelength of light of the laser beam; and
    transmitting the information to a remote entity.

8. The method of claim 1, further comprising converting the position on the ground of the laser into at least one of a street address and a map grid reference.

9. The method of claim 8, further comprising transmitting the time of the strike and at least one street address and the map grid reference to a remote entity.

10. The method of claim 8, further comprising determining the position on the ground of the laser that emitted the laser beam while the aircraft is in flight and transmitting the position on the ground of the laser to a remote entity while the aircraft is in flight.

11. A computing device configured to determine a position on the ground of a laser that emits a laser beam that strikes an aircraft, the computing device comprising:
    a camera that detects a strike position of the laser beam on an imaging sensor of the camera and wherein the position of the laser on the ground is unknown to persons on the aircraft when the laser beam is emitted and strikes the aircraft;
    processing circuitry operatively connected to the camera and configured to:

compute a relative direction vector of the laser beam with respect to the camera based on the strike position;
determine a global orientation of the camera and a global position of the camera;
convert the relative direction vector into a global coordinate direction vector using the global orientation and the global position; and
determine an intersection of the global coordinate direction vector and the representation of the ground as the position on the ground of the laser.

12. The computing device of claim 11, further comprising:
an exterior housing that extends around each of the camera, an orientation sensor, a position sensor, and the processing circuitry; and
a mount attached to the exterior housing to removably attach the computing device in a cockpit of the aircraft.

13. The computing device of claim 11, wherein the camera and the processing circuitry are integrated into the aircraft and the global orientation and the global position of the camera are determined by one or more components integrated into the aircraft.

14. The device of claim 11, wherein the processing circuitry is further configured to determine:
a horizontal pixel distance from a predetermined point of the imaging sensor to the strike position;
a vertical pixel distance from the predetermined point to the strike position;
an azimuth angle based on the horizontal pixel distance; and
an elevation angle based on the vertical pixel distance.

15. The device of claim 11, wherein the processing circuitry is further configured to determine the global orientation of the camera using one of Euler angles, quaternions, an angle-axis representation, and a rotation matrix.

16. The device of claim 11, wherein the processing circuitry is further configured to:
obtain an elevation above mean sea level of an airport in proximity to the aircraft; and
determine the intersection of the global coordinate direction vector with the representation of the ground based on the elevation of the airport.

17. The device of claim 11, wherein the intersection of the global coordinate direction vector and the representation of the ground is an estimated first intersection, the processing circuitry further configured to:
determine that a second strike from the laser beam from the laser has subsequently struck the imaging sensor;
determine a second global orientation of the camera and a second global position of the camera when the imaging sensor is struck by the laser beam for the second time;
compute a second relative direction vector of the second strike from the laser beam with respect to the camera;
convert the second relative direction vector into a second global coordinate direction vector using the second global orientation and the second global position;
determine a second position estimate of the laser on the ground based on a second intersection where the second global coordinate direction vector intersects with the representation of the ground; and
determine an updated position of the laser on the ground based on the first intersection position estimate and the second intersection position estimate.

18. The device of claim 11, wherein the processing circuitry is further configured to determine a time that the laser beam struck the aircraft, and a wavelength of the laser beam.

19. The device of claim 11, further comprising communication circuitry configured to transmit to a remote entity the position on the ground of the laser while the aircraft is in flight.

20. A non-transitory computer readable medium storing a computer program product to control a programmable computing device, the computer program product comprising software instructions that, when executed on processing circuitry of the programmable computing device, cause the processing circuitry to:
determine a strike position from a camera that is located in a cockpit of an aircraft, the strike position comprising a position on an imaging sensor corresponding to where a laser beam strikes the camera on the aircraft wherein a position on the ground of a laser is unknown to persons on the aircraft when the laser beam is emitted from the laser and strikes the aircraft;
determine a global orientation of the camera and a global position of the camera;
compute a relative direction vector of the laser beam with respect to the camera;
convert the relative direction vector into a global coordinate direction vector using the global orientation and the global position of the camera; and
determine the position on the ground of the laser that emitted the laser beam, the position comprising a point where the global coordinate direction vector intersects with the representation of the ground.

21. A system configured to determine a position of a laser that emits a laser beam, the system comprising:
a first computing device comprising:
a first camera having a first imaging sensor and being located on or in a first aircraft, the first camera configured to detect a strike position of a first strike from laser beam from the laser on the first imaging sensor;
first processing circuitry configured to collect first data regarding the first camera;
first communication circuitry configured to transmit the first data;
a second computing device comprising:
a second camera having a second imaging sensor and being located on or in a second aircraft, the second camera configured to detect a strike position of a second strike from the laser beam from the laser on the second imaging sensor;
second processing circuitry configured to collect second data regarding the second camera;
second communication circuitry configured to transmit the second data;
a processing device comprising:
communication circuitry configured to receive the first data and the second data;
processing circuitry configured to, based first data and the second data:
determine a global orientation of the first camera and the second camera, and a global position of the first camera and the second camera;
compute a relative direction vector of the first strike of the laser beam with respect to the first camera based on the strike position of the first strike of the laser beam on the first imaging sensor;

convert the relative direction vector of the first strike of the laser beam into a first global coordinate direction vector using the global orientation and the global position of the first camera;

compute a relative direction vector of the second strike of the laser beam with respect to the second camera based on the strike position of the second strike of the laser beam on the second imaging sensor;

convert the relative direction vector of the second strike of the laser beam into a second global coordinate direction vector using the global orientation and the global position of the second camera; and determine the position on the ground of the laser based on intersections of the global coordinate direction vectors of both of the first strike and the second strike of the laser beam and the representation of the ground.

22. The system of claim 21, wherein the processing device is located on one of the first aircraft and the second aircraft.

23. The system of claim 21, wherein the first computing device is a first smartphone device and the second computing device is a second smartphone device.

24. The system of claim 21, wherein the processing device is located remotely from the first camera and the second camera.

25. The system of claim 21, wherein the processing device is further configured to:

convert the position of the laser into at least one of a street address and a map grid reference; and transmit the at least one street address and the map grid reference to a remote entity.

26. The system of claim 21, wherein the processing device is further configured to determine the position of the laser while both of the first aircraft and the second aircraft are in flight and to transmit the position of the laser to a remote entity while the first aircraft and the second aircraft are in flight.

27. The system of claim 21, wherein the processing device is further configured to:

obtain an elevation of an airport above mean sea level in proximity to the first aircraft and the second aircraft;

determine the intersections of the global coordinate direction vectors of both of the first strike and the second strike of the laser beam and a representation of the ground that is at the elevation of the airport; and determine the position of the laser based on the representation of the ground intersections of the global coordinate direction vectors.

28. A method of determining a position of a laser on the ground that emits a laser beam that strikes a first aircraft and a second aircraft, the method comprising:

determining a first strike position of the laser beam on a first imaging sensor of a first camera with the first camera located in or on the first aircraft and the laser beam being emitted from the laser positioned on the ground;

determining a first global orientation and a first global position of the first camera;

computing a first relative direction vector of the first strike of the laser beam with respect to the first camera;

converting the first relative direction vector into a first global coordinate direction vector;

determining a first position estimate on the ground of the laser, the first position estimate comprising where the first global coordinate direction vector intersects with the representation of the ground;

determining a second strike position of the laser beam on a second imaging sensor of a second camera with the second camera located in or on the second aircraft;

determining a second global orientation and a second global position of the second camera;

computing a second relative direction vector of the second strike of the laser beam with respect to the second camera;

converting the second relative direction vector into a second global coordinate direction vector;

determining a second position estimate on the ground of the laser, the second position estimate comprising where the second global coordinate direction vector intersects with the representation of the ground; and determining the position of the laser on the ground based on the first position estimate and the second position estimate.

29. The method of claim 28, wherein determining the position of the laser on the ground is based on the first position estimate and the second position estimate comprises combining the ground position estimates and creating an updated overall ground position estimate.

* * * * *